(12) United States Patent
Asano et al.

(10) Patent No.: US 11,038,171 B2
(45) Date of Patent: Jun. 15, 2021

(54) ACTIVE MATERIAL INCLUDING COMPOSITE FLUORIDE FOR FLUORIDE ION SECONDARY BATTERY, AND FLUORIDE ION SECONDARY BATTERY USING THE SAME

(71) Applicant: Panasonic Intellectual Property Management Co., Ltd., Osaka (JP)

(72) Inventors: Kazuko Asano, Osaka (JP); Kensuke Nakura, Osaka (JP); Mitsuhiro Hibino, Kyoto (JP); Jin Zhang, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 65 days.

(21) Appl. No.: 16/405,385

(22) Filed: May 7, 2019

(65) Prior Publication Data

US 2019/0363361 A1 Nov. 28, 2019

(30) Foreign Application Priority Data

May 22, 2018 (JP) .............................. JP2018-097515
Feb. 15, 2019 (JP) .............................. JP2019-025922

(51) Int. Cl.
*H01M 4/58* (2010.01)
*H01M 10/05* (2010.01)
*H01M 4/02* (2006.01)

(52) U.S. Cl.
CPC ........... *H01M 4/582* (2013.01); *H01M 10/05* (2013.01); *H01M 2004/028* (2013.01)

(58) Field of Classification Search
None
See application file for complete search history.

(56) References Cited

U.S. PATENT DOCUMENTS

| 2008/0034579 | A1 | 2/2008 | Potanin |
| 2008/0102373 | A1 | 5/2008 | Potanin |
| 2010/0035155 | A1 | 2/2010 | Okada et al. |
| 2017/0237067 | A1 | 8/2017 | Miki et al. |

FOREIGN PATENT DOCUMENTS

| EP | 2093821 A1 | 8/2009 |
| JP | 2008-198447 A | 8/2008 |
| JP | 2008-537312 | 9/2008 |
| JP | 2008-243646 | 10/2008 |
| JP | 2008-538649 | 10/2008 |
| JP | 2013-145758 | 7/2013 |
| WO | 2007/146453 | 12/2007 |

OTHER PUBLICATIONS

The Extended European Search Report dated Jul. 24, 2019 for the related European Patent Application No. 19173536.4.
David S. Crocket et al: "Synthesis of Fluorometallates in Methanol. Some Structure Relationships 1a", Journal of the American Chemical Society, vol. 82, No. 16, Aug. 20, 1960 (Aug. 20, 1960), pp. 4158-4162, XP055605206.

*Primary Examiner* — Laura Weiner
(74) *Attorney, Agent, or Firm* — McDermott Will and Emery LLP

(57) ABSTRACT

An active material for a fluoride ion secondary battery includes a composite fluoride which contains: an alkali metal or $NH_4$; a transition metal; and fluorine.

10 Claims, 2 Drawing Sheets

ACTIVE MATERIAL INCLUDING COMPOSITE FLUORIDE FOR FLUORIDE ION SECONDARY BATTERY, AND FLUORIDE ION SECONDARY BATTERY USING THE SAME

BACKGROUND

1. Technical Field

The present disclosure relates to an active material for a fluoride ion secondary battery and a fluoride ion secondary battery using the same.

2. Description of the Related Art

In recent years, a fluoride ion secondary battery using fluoride ions has been proposed.

For example, Japanese Unexamined Patent Application Publication No. 2013-145758 has disclosed a fluoride ion electrochemical cell. This patent literature has disclosed as a positive electrode material, $CF_x$, $AgF_x$, $CuF_x$, $NiF_x$, $CoF_x$, $PbF_x$, and $CeF_x$, and as a negative electrode material, $LaF_x$, $CaF_x$, $AlF_x$, $EuF_x$, $LiC_6$, $Li_xSi$, $SnF_x$, and $MnF_x$.

SUMMARY

In one general aspect, the techniques disclosed here feature an active material for a fluoride ion secondary battery, the active material comprising a composite fluoride which contains: an alkali metal or $NH_4$; a transition metal; and fluorine.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
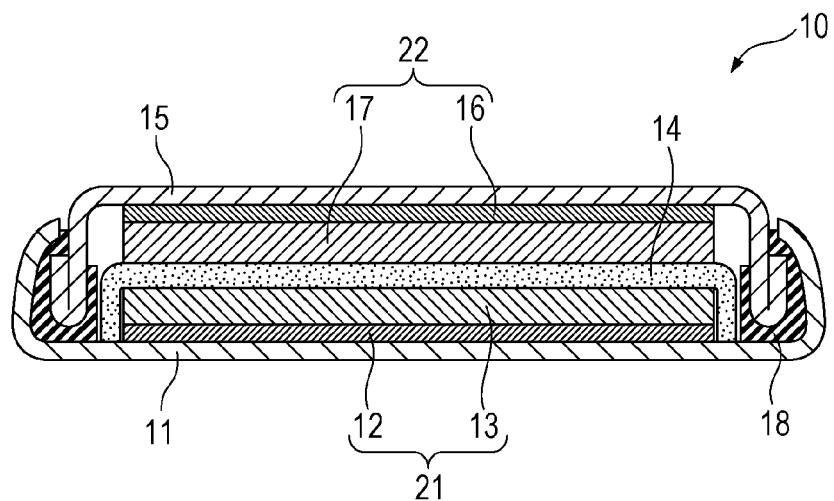
FIG. 1 is a cross-sectional view schematically showing an example of a fluoride ion secondary battery according to an embodiment.

The following descriptions each show a comprehensive or a concrete example. The following numerical value, composition, shape, film thickness, electrical characteristics, structure of a secondary battery, electrode material, and the like are shown by way of example and are not intended to limit the present disclosure. A constituent element not described in an independent claim that shows the topmost concept is an arbitrary constituent element.

In the following descriptions, unless otherwise specifically noted, a material represented by a substance name is not limited to a material having a stoichiometric composition and may also includes a material having a non-stoichiometric composition.

In the following descriptions, a numerical range represented by the phrase "x to y" is to be understood that the values "x" and "y" are included in the above range.

[1. Active Material]

[1-1. Composition of Active Material]

An active material according to this embodiment includes a composite fluoride which contains an alkali metal or $NH_4$, a transition metal, and fluorine. This active material may be either a positive electrode active material or a negative electrode active material.

A discharge curve of this active material shows a flat plateau potential. Therefore, when this active material is used for a fluoride ion secondary battery, this battery is able to show a stable output voltage.

The above composite fluoride may be a metal composite fluoride containing an alkali metal and a transition metal. The alkali metal is at least one selected from the group consisting of Na, K, Rb, and Cs.

Alternatively, the composite fluoride may also be an inorganic composite fluoride containing $NH_4$ and a transition metal. In this case, the "containing $NH_4$" indicates that when the composite fluoride is represented by a composition formula, the composition formula includes $NH_4$. An example of "the inorganic composite fluoride containing $NH_4$" includes a salt containing an ammonium ion ($NH_4^+$) as a cation but not includes a complex salt containing an ammonium molecule ($NH_3$) as a ligand. However, an active material further including, besides the above composite fluoride, a complex salt (for example, as a subcomponent) is not disclaimed.

The transition metal may also be a 3d transition metal. The 3d transition metal may be, for example, at least one selected from the group consisting of Mn, Fe, Co, Ni, and Cu. Mn, Fe, Co, Ni, and Cu are each able to increase an electrode potential. This can be confirmed by calculation using the standard Gibbs energy of formation. Hence, a composite fluoride containing Mn, Fe, Co, Ni, and/or Cu is, for example, able to function as a positive electrode active material.

The composite fluoride may be represented by a composition formula of $A_xM_yF_z$, where A represents Na, K, Rb, Cs, or $NH_4$; M represents at least one selected from the group consisting of Mn, Fe, Co, Ni, and Cu; and $1 \leq x \leq 2$, $1 \leq y \leq 2$, and $3 < z < 5$.

In the composition formula, since $1 \leq x$ is satisfied, promotion of a defluorination reaction in association with cationization of the alkali metal or $NH_4$ can be expected. Since $x \leq 2$ and $1 \leq y$ are satisfied, the ratio of the transition metal responsible for an electrode reaction can be increased. Since $y \leq 2$ is satisfied, a reaction of a transition metal having a relatively large valence (such as +2 to +4) can be used. When the change in large valence can be used in the electrode reaction, the electrode potential can be increased. Since $3 < z < 5$ is satisfied, while the decrease in density of the composite fluoride is suppressed, the ratio of fluorine involved in the electrode reaction can be increased.

In the above composition formula, furthermore, A may also represent K, Cs, or $NH_4$. For example, when one of $K^+$, $Cs^+$, and $NH_4^+$ is arranged at a desired site in a crystalline structure of the composite fluoride, a cation having a desired ion radius may be selected.

In the above composition formula, the above M may also represent Cu. Cu has a high electrode potential as compared to that of each of the other 3d transition metals. Hence, when this active material is used as a positive electrode active material, the potential of the positive electrode can be increased.

The composition of the active material (or the composite fluoride) can be determined, for example, by an inductively-coupled plasma (ICP) emission spectrochemical analytical method and an ion chromatography. The crystalline structure of the composite fluoride thus obtained can be determined by a powder X-ray diffraction (XRD) analysis.

The composite fluoride may be, for example, either a solid solution or an amorphous substance.

The active material may contain the above composite fluoride as a primary component. In this case, the "containing as a primary component" indicates that the active material contains at least 50 percent by volume of the above composite fluoride.

For example, the active material includes a plurality of phases, and at least one of the plurality of phases may belong to the above composite fluoride.

For example, the active material may include, besides the above composite fluoride, a fluoride (such as $MF_\alpha$: α indicates an actual number of 0 or more) of a transition metal which is the same as the transition metal contained in the above composite fluoride.

For example, the active material may contain no oxygen atom. Accordingly, a risk of ignition induced by the presence of an oxygen gas can be avoided.

Although the shape of the active material is not particularly limited, for example, the shape thereof is particles. When the shape of the active material is particles, the average particle diameter thereof is not particularly limited and, for example, may be 0.5 to 50 μm. In this case, the average particle diameter may be defined as the median diameter of a volume-basis particle size distribution obtained by a laser diffraction scattering method.

[1-2. Assumed Mechanism]

Heretofore, as the active material for a fluoride ion secondary battery, metal fluorides (such as $MF_x$) each containing a single metal have been reported in many cases. Those metal fluorides each exhibit a conversion reaction based on defluorination and fluorination performed in association with charge/discharge of the battery. In particular, during the discharge, the positive electrode active material is defluorinated from a metal fluoride to a metal, and during the charge, the positive electrode active material is fluorinated from a metal to a metal fluoride. During the discharge, the negative electrode active material is fluorinated from a metal to a metal fluoride, and during the charge, the negative electrode active material is defluorinated from a metal fluoride to a metal.

However, a related active material had a problem in that the conversion reaction as described above could not be sufficiently obtained. When the conversion reaction can be ideally performed, it is expected that the charge/discharge curves thereof each exhibit a flat plateau potential. On the other hand, when an unnecessary side reaction occurs between the active material and an electrolyte liquid, this side reaction may cause degradation of the charge/discharge characteristics.

Since containing an alkali metal or $NH_4$, the active material according to this embodiment promotes the conversion reaction which is a main reaction. Hence, as described later, the discharge curve of the active material exhibits a flat plateau potential. Although the reason for this has not been clearly understood, as one possibility, the present inventors have assumed as described below.

Compared to the transition metal (such as Mn, Fe, Co, Ni, or Cu) contained in the active material, an alkali metal and $NH_4$ each have a high ionization tendency. Therefore, during the discharge, an alkali metal and $NH_4$ each preferentially dissociated from the active material as compared to the transition metal, and consequently, the decomposition of the active material is promoted. As a result, the reaction rate of the main reaction is increased, and the side reaction can be suppressed.

For example, when the active material according to this embodiment is represented by the above composition formula, and in addition, when y=1 is satisfied, the discharge reaction may be assumed as follows.

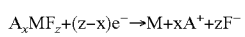

$$A_xMF_z + (z-x)e^- \rightarrow M + xA^+ + zF^-$$

The mechanism described above is simply based on the assumption and is not intended to limit the present disclosure. For example, when the valence of the transition metal is changed in a stepwise manner during the defluorination, the discharge reaction may become more complicated.

[1-3. Method for Manufacturing Active Material]

One example of a method for manufacturing an active material according to this embodiment will be described.

First, as raw materials, a fluoride containing an alkali metal or $NH_4$ and a fluoride containing a transition metal are prepared.

The fluoride containing an alkali metal or $NH_4$ is, for example, a fluoride AF, where A represents Na, K, Rb, Cs, or $NH_4$.

The fluoride containing a transition metal is, for example, a transition metal fluoride $MF_n$, where M represents a transition metal, and n indicates the valence of the transition metal. Examples of the transition metal fluoride include $MnF_2$, $FeF_3$, $FeF_2$, $CoF_3$, $CoF_2$, $NiF_2$, and $CuF_2$.

In addition, the raw materials for the active material are not limited to those described above. For example, a transition metal source may be a single metal element. For example, a raw material containing a plurality of metals may also be used.

The shape of each raw material is, for example, a powder.

Next, the raw materials thus prepared are weighed. The amount of each raw material is appropriately adjusted in accordance with the composition of a target composite fluoride.

Next, the raw materials thus weighed are mixed together.

For example, when the raw materials are mixed together for a long time, a composite fluoride is obtained by a mechanochemical reaction. In this case, examples of a mixing device include a ball mill, a rod mill, a bead mill, a jet mill, and a mix rotor. As a mixing method, for example, either a dry method or a wet method may be used. In the case of the wet method, the raw materials may be mixed with an organic solvent. As the organic solvent, for example, ethanol or acetone may be used. A mixing time is, for example, 10 to 48 hours.

Alternatively, after the raw materials are mixed together for a short time, a composite fluoride may be obtained by firing. For the mixing, the mixing device described above may also be used, or a mortar may be used. As a mixing method, for example, either a dry method or a wet method may be performed. For example, when a mortar is used, a mixing time is 1 to 30 minutes, and when a ball mill is used, the mixing time is 10 to 24 hours. A mixture thus obtained is fired in an inert atmosphere. Examples of an inert gas include nitrogen and argon. Although being changed depending on the types of raw materials and/or the target composition, a temperature condition is set, for example, to 200° C. to 800° C. A firing time is set, for example, to 3 to 24 hours.

The method for manufacturing an active material is not limited to the examples described above. Examples of the method for manufacturing an active material include a vapor phase method, such as sputtering or chemical vapor deposition (CVD), or a liquid phase method, such as a dipping method.

[2. Fluoride Ion Secondary Battery]

[2-1. Configuration]

The active material according to this embodiment may be used for a fluoride ion secondary battery. That is, the fluoride ion secondary battery includes a positive electrode, a negative electrode, and an electrolyte having a fluoride ion conductivity.

FIG. 1 is a cross-sectional view schematically showing an example of a fluoride ion secondary battery 10.

The fluoride ion secondary battery 10 includes a positive electrode 21, a negative electrode 22, a separator 14, a case 11, a sealing plate 15, and a gasket 18. The separator 14 is disposed between the positive electrode 21 and the negative electrode 22. In the positive electrode 21, the negative electrode 22, and the separator 14, an electrolyte is impregnated, and those components described above are received in the case 11. The case 11 is sealed by the gasket 18 and the sealing plate 15.

The structure of the fluoride ion secondary battery 10 may be, for example, a cylindrical type, a square type, a button type, a coin type, or a flat type.

[2-2. Positive Electrode]

The positive electrode 21 includes a positive electrode collector 12 and a positive electrode active material layer 13 disposed on the positive electrode collector 12.

The positive electrode active material layer 13 may have the active material described in the above [1-1. Composition of Active Material]. In addition, the amount of fluorine in the active material can be changed in association with charge/discharge. Hence, for example, in a certain charged state of the fluoride ion secondary battery 10, the active material may have the composition described in the above [1-1. Composition of Active Material].

The "certain charged state" may be a fully charged state, for example. Here, the "fully charged state" indicates the state in which the voltage of the fluoride ion secondary battery reaches a charge end voltage, and the battery is fully charged. In the fully charged state, fluoride ions in an amount corresponding to the reversible capacity are all incorporated in the positive electrode active material. For example, when the charge potential is −0.9 V or more with reference to the Ag/AgCl basis, the positive electrode active material according to this embodiment can be regarded to be in a fully charged state.

The positive electrode active material may be not the above active material and may be, for example, a metal, an alloy, or a fluoride, each of which contains at least one selected from the group consisting of Cu, Ag, Hg, Mo, Au, Co, V, Bi, Sb, Ni, Tl, Pb, Cd, Fe, V, Nb, Zn, Ga, and Cr. Alternatively, the positive electrode active material may be a carbon fluoride.

The positive electrode active material layer 13 may contain either only one active material or at least two types of active materials.

The positive electrode active material layer 13 may further include, if needed, an electrically conductive agent, a binding agent, and/or an ion conductor.

Examples of the electrically conductive agent include a carbon material, a metal, an inorganic compound, and an electrically conductive high molecular weight material. Examples of the carbon material include graphite, carbon black, carbon nanotubes, carbon fibers, a graphene, a fullerene, a graphite fluoride, and oxidized graphite. Examples of the graphite include natural graphite and artificial graphite. Examples of the carbon black include acetylene black, Ketjen black (registered trade name), channel black, furnace black, lamp black, and thermal black. Examples of the metal include copper, nickel, aluminum, silver, and gold. Examples of the inorganic compound include tungsten carbide, titanium carbide, tantalum carbide, molybdenum carbide, titanium boride, titanium nitride, titanium oxide, zinc oxide, and titanate potassium. Examples of the electrically conductive high molecular weight material include a polyaniline, a polypyrrole, and a polythiophene.

Examples of the binding agent include a poly(vinylidene fluoride), a polytetrafluoroethylene, a polyethylene, a polypropylene, an aramid resin, a polyamide, a polyimide, a poly(amide imide), a polyacrylonitrile, a polyacrylic acid, a poly(methyl acrylate), a poly(ethyl acrylate), a poly(hexyl acrylate), a polymethacrylic acid, a poly(methyl methacrylate), a poly(ethyl methacrylate), a poly(hexyl methacrylate), a poly(vinyl acetate), a poly(vinyl pyrrolidone), a polyether, a poly(ether sulfone), a hexafluoropolypropylene, a styrene-butadiene rubber, and a carboxymethyl cellulose. Alternatively, for example, the binding agent may be a copolymer formed from at least two types selected from the group consisting of tetrafluoroethylene, hexafluoroethylene, hexafluoropropylene, a perfluoroalkyl vinyl ether, vinylidene fluoride, chlorotrifluoroethylene, ethylene, propylene, pentafluoropropylene, fluoromethyl vinyl ether, acrylic acid, and hexadiene.

Examples of the ion conductor include a Pb—K composite fluoride, a La—Ba composite fluoride, a Ce—Sr composite fluoride, a Cs—Ca composite fluoride, a Ce—Sr—Li composite fluoride, a Pb—Sn composite fluoride, and a Pb—Sn—Zr composite fluoride.

Examples of a solvent dispersing the positive electrode active material, the electrically conductive agent, and the binding agent include N-methyl pyrrolidone, dimethylformamide, dimethylacetamide, methyl ethyl ketone, cyclohexanone, methyl acetate, methyl acrylate, diethylenetriamine, N,N-dimethylaminopropylamine, ethylene oxide, and tetrahydrofuran. For example, a thickening agent may be added to a dispersant. Examples of the thickening agent include a carboxymethyl cellulose and a methylcellulose.

The positive electrode active material layer 13 may be formed, for example, as described below.

First, the positive electrode active material, the electrically conductive agent, and the binding agent are mixed together. For example, after the positive electrode active material and the electrically conductive agent are dry-mixed with each other for a long time (such as 10 to 24 hours) using a mixing device, such as a ball mill, to form a mixture, the binding agent is added thereto, and mixing is further performed. Accordingly, a positive electrode mixture is obtained. Subsequently, the positive electrode mixture is rolled by a rolling machine to have a plate shape, so that the positive electrode active material layer 13 is formed. Alternatively, a solvent is added to the mixture described above to form a positive electrode mixture paste, and this paste may be applied to a surface of the positive electrode collector 12. When the positive electrode mixture paste is dried, the positive electrode active material layer 13 is obtained. In addition, in order to increase the electrode density, the positive electrode active material layer 13 may be compressed.

Although the film thickness of the positive electrode active material layer 13 is not particularly limited, the film thickness thereof may be 1 to 500 µm or may also be further 50 to 200 µm.

A material of the positive electrode collector 12 is, for example, a metal or an alloy. In more particular, the material of the positive electrode collector 12 may be at least one metal selected from the group consisting of copper, chromium, nickel, titanium, platinum, gold, aluminum, tungsten, iron, molybdenum, and zirconium or an alloy thereof. The material of the positive electrode collector 12 may also be, for example, stainless steel.

The positive electrode collector 12 may have either a plate shape or a foil shape and may also be formed from a porous material, a mesh material, or a non-porous material. The positive electrode collector 12 may also be a laminated film. The positive electrode collector 12 may have a layer formed of a carbon material, such as carbon, so as to be in contact with the positive electrode active material layer 13.

When the case 11 also functions as a positive electrode collector, the positive electrode collector 12 may be omitted.

[2-3. Negative Electrode]

The negative electrode 22 includes, for example, a negative electrode active material layer 17 containing a negative electrode active material and a negative electrode collector 16.

As long as the electrode potential of the negative electrode active material is lower than the electrode potential of the positive electrode active material, the negative electrode active material may be the active material described in the above [1-1. Composition of Active Material]. In addition, the amount of fluorine in the active material can be changed in association with charge/discharge. Hence, in a certain discharged state of the fluoride ion secondary battery 10, the active material may have the composition described in the above [1-1. Composition of Active Material].

The "certain discharged state" may be a fully discharged state, for example. Here, the "fully discharged state" indicates the state in which the voltage of the fluoride ion secondary battery reaches a discharge end voltage, and the battery is fully discharged. In the fully discharged state, fluoride ions in an amount corresponding to the reversible capacity are all incorporated in the negative electrode active material.

The negative electrode active material may be not the active material mentioned above and may be, for example, a metal, an alloy, or a fluoride, each of which contains at least one selected from the group consisting of La, Ca, Al, Eu, C, Si, Ge, Sn, In, V, Cd, Cr, Fe, Zn, Ga, Ti, Nb, Mn, Yb, Zr, Sm, La, Ce, Rb, Cs, Mg, K, Na, Ba, and Sr.

The negative electrode active material layer 17 may include either only one active material or at least two types of active materials.

The negative electrode active material layer 17 may further include, if needed, an electrically conductive agent, a binding agent, and/or an ion conductor. As the electrically conductive agent, the binding agent, the ion conductor, a solvent, and a thickening agent, for example, those described in the above [2-2. Positive Electrode] may be appropriately used.

Although the film thickness of the negative electrode active material layer 17 is not particularly limited, the film thickness thereof may be 1 to 500 µm and may be further 50 to 200 µm.

As a material of the negative electrode collector 16, for example, a material similar to the material of the positive electrode collector 12 described in the above [2-2. Positive Electrode] may be appropriately used. The negative electrode collector 16 may have a plate shape or a foil shape.

When the case 11 also functions as a negative electrode collector, the negative electrode collector 16 may be omitted.

[2-4. Separator]

Examples of the separator 14 include a porous film, a woven cloth, and a non-woven cloth. Examples of the non-woven cloth include a resin non-woven cloth, a glass non-woven cloth, and a paper-made non-woven cloth. As a material of the separator 14, a polyolefin, such as a polypropylene or a polyethylene, may be used. The thickness of the separator 14 is, for example, 10 to 300 µm. The separator 14 may be either a monolayer film formed from one material or a composite film (or a multilayer film) formed from at least two types of materials. The porosity of the separator 14 is, for example, in a range of 30% to 70%.

[2-5. Electrolyte]

The electrolyte may be a material having a fluoride ion conductivity.

The electrolyte is, for example, an electrolyte liquid. The electrolyte liquid includes a solvent and a fluoride salt dissolved in the solvent. The solvent may be water or a non-aqueous solvent.

Examples of the non-aqueous solvent include an alcohol, a cyclic ether, a chain ether, a cyclic carbonate ester, a chain carbonate ester, a cyclic carboxylic acid ester, and a chain carboxylic acid ester.

Examples of the alcohol include ethanol, ethylene glycol, and propylene glycol.

Examples of the cyclic ether include 4-methyl-1,3-dioxolane, 2-methyltetrahydrofuran, and a crown ether. Examples of the chain ether include 1,2-dimethoxyethane, ethylene glycol dimethyl ether, diethylene glycol dimethyl ether, triethylene glycol dimethyl ether, and tetraethylene glycol dimethyl ether. Examples of the cyclic carbonate ester include ethylene carbonate, propylene carbonate, butylene carbonate, fluoroethylene carbonate, and 4,5-difluoroethylene carbonate. Examples of the chain carbonate ester include dimethyl carbonate, ethyl methyl carbonate, and diethyl carbonate. Examples of the cyclic carboxylic acid ester include γ-butyrolactone. Examples of the chain carboxylic acid ester include ethyl acetate, propyl acetate, and butyl acetate.

For example, the non-aqueous solvent may also be an ionic liquid.

Examples of a cation of the ionic liquid include 1-ethyl-3-methylimidazolium cation, 1-ethylpyridinium cation, 1-methoxyethyl-1-methylpyrrolidinium cation, N-methyl-N-propylpiperidinium cation, trimethylbutylammonium cation, N,N-diethyl-N-methylmethoxyethylammonium cation, tetrabutylphosphonium cation, triethyl-(2-methoxyethyl) phosphonium cation, triethylsulfonium cation, and diethyl-(2-methoxyethyl)sulfonium cation.

Examples of an anion of the ionic liquid include bis (fluorosulfonyl)amide anion, bis(trifluoromethanesulfonyl) amide anion, hexafluorophosphate anion, tris(pentafluoroethyl)trifluorophosphate anion, trifluoromethanesulfonate anion, and tetrafluoroborate anion.

The electrolyte may contain either only one solvent or at least two types of solvents.

Examples of the fluoride salt include an inorganic fluoride salt, an organic fluoride salt, and an ionic liquid.

Examples of the inorganic fluoride salt include lithium fluoride, sodium fluoride, potassium fluoride, rubidium fluoride, cesium fluoride, and ammonium fluoride.

Examples of the organic fluoride salt include tetramethylammonium fluoride, neopentyltrimethylammonium fluoride, trineopentylmethylammonium fluoride, tetraneopentylammonium fluoride, 1,3,3,6,6-hexamethylpiperidinium fluoride, 1-methyl-1-propylpiperidinium fluoride, tetramethylphosphonium fluoride, tetraphenylphosphonium fluoride, and trimethylsulfonium fluoride.

The electrolyte may contain either only one fluoride salt or at least two types of fluoride salts.

The solvent and the fluoride salt are, for example, sealed in a sealing container and are mixed together by stirring. Accordingly, the fluoride salt is dissolved in the solvent. In addition, the fluoride salt may be not totally dissolved in the solvent and may partially remain without being dissolved.

The molar ratio of the fluoride salt to the solvent in the electrolyte liquid is not particularly limited and may be, for example, 1/150 to 1/2, may be 1/30 to 1/4, or further may be 1/10 to 1/5. Accordingly, while the increase in viscosity of the electrolyte liquid is suppressed, the concentration of the fluoride ions in the electrolyte liquid can be increased.

When the positive electrode active material or the negative electrode active material contains the composite fluoride described in the above [1. Active Material], the electrolyte may contain ions of an alkali metal which is the same as the alkali metal contained in the above composite fluoride or ammonium ions. In addition, the electrolyte may further contain ions of a transition metal which is the same as the transition metal contained in the above composite fluoride.

[2-6. Modified Example]

Figure 2:
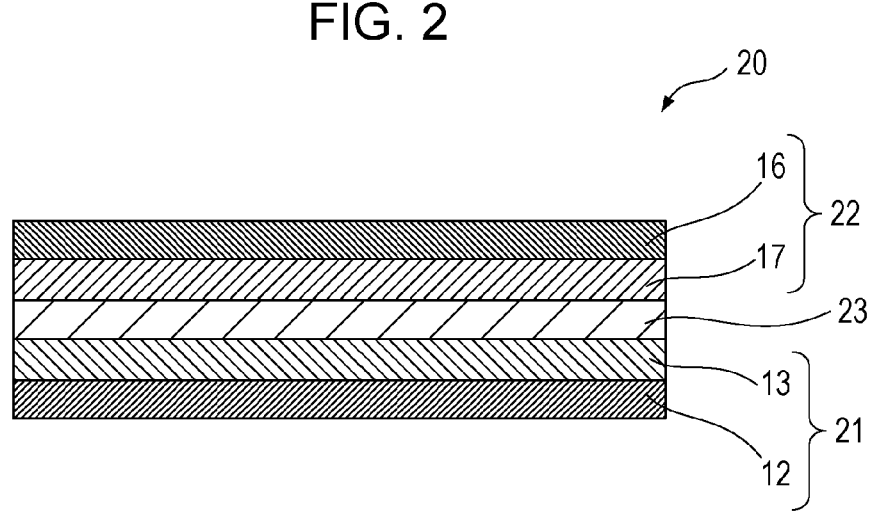
FIG. 2 is a cross-sectional view schematically showing a modified example of the fluoride ion secondary battery according to the embodiment.

FIG. 2 is a cross-sectional view schematically showing an example of a fluoride ion secondary battery 20.

The fluoride ion secondary battery 20 includes a positive electrode 21, a negative electrode 22, and a solid electrolyte 23. The positive electrode 21, the solid electrolyte 23, and the negative electrode 22 are laminated in this order to form a laminate.

The positive electrode 21 is, for example, similar to that described in the above [2-2. Positive Electrode]. The negative electrode 22 is, for example, similar to that described in the above [2-3. Negative Electrode].

As the solid electrolyte 23, the ion conductor described in the above [2-2. Positive Electrode] may be used.

Although the film thickness of the solid electrolyte 23 is not particularly limited, the film thickness thereof may be 1 to 100 μm.

[3. Experimental Results]
[3-1. Formation of Sample]

In accordance with the following procedure, various samples were formed.

[3-1-1. Formation of Samples 1 to 3]

First, as raw materials, anhydrous cesium fluoride (CsF) and anhydrous copper fluoride (II) ($CuF_2$) were prepared. Those raw materials were weighed so that the molar ratio was set to CsF:$CuF_2$=2:1, and the total mass was 7 g. The raw materials thus weighed were charged in a 50-cc polyethylene-made container in which 12 g of ethanol was received in advance together with zirconia-made balls having a diameter of 5 mm, and the container was then sealed. The operations described above were all performed in a glove box in an argon atmosphere in which the dew point was set to −60° C. or less, and the oxygen value was set to 1 ppm or less. Subsequently, the container was set to a constant-temperature bath of a mix rotor. After the temperature of the constant-temperature bath was set to 60° C., the raw materials in the container were stirred at a revolution of 100 rpm for 10 days. Accordingly, Sample 1 of an active material was obtained.

$CuF_2$ in a mass of 7 g was weighed, so that Sample 2 of the active material was obtained.

Except for that anhydrous ammonium fluoride ($NH_4F$) was used instead of CsF, by a method similar to that of Sample 1, Sample 3 of the active material was obtained.

[3-1-2. Formation of Samples 4 to 6]

First, as raw materials, anhydrous sodium fluoride (NaF) and anhydrous nickel fluoride (II) ($NiF_2$) were prepared. Those raw materials were weighed so that the molar ratio was set to NaF:$NiF_2$=1:1, and the total mass was 1.5 g. The raw materials thus weighed were charged in an agate mortar and then dry-mixed for 15 minutes. The mixture thus obtained was powder-compacted using a mold having a diameter of 15 mm, so that a pellet was obtained. After this pellet was placed in a combustion boat in which Pt foil was laid, this boat was placed in a small electric furnace. The temperature in the furnace was increased from room temperature to 600° C. at a rate of 300° C./hour and was then maintained at 600° C. for 5 hours. The operations described above were all performed in a glove box in an argon atmosphere in which the dew point was set to −60° C. or less, and the oxygen value was set to 1 ppm or less. Accordingly, the mixture was fired, so that Sample 4 of an active material was obtained.

Except for that anhydrous rubidium fluoride (RbF) was used instead of NaF, by a method similar to that of Sample 4, Sample 5 of the active material was obtained.

Except for that anhydrous manganese fluoride (II) ($MnF_2$) was used instead of $NiF_2$, by a method similar to that of Sample 4, Sample 6 of the active material was obtained.

[3-2. Analysis of Sample]

By the use of an XRD method, a phase composition of Sample 1 was analyzed. As a result, Sample 1 had a single phase structure of $Cs_2CuF_4$. The phase structures of Samples 3 to 6 were each analyzed in a manner similar to that described above. Sample 3 had a single phase structure of $(NH_4)_2CuF_4$. Sample 4 had a single phase structure of $NaNiF_3$. Sample 5 had a single phase structure of $RbNiF_3$. Sample 6 had a single phase structure of $NaMnF_3$.

[3-3. Formation of Battery]
[3-3-1. Formation of Battery Cells using Samples 1 to 3]

By the use of Sample 1 of the positive electrode active material, an evaluation battery cell was formed. Operations for the formation of the battery were all performed in a glove box in an argon atmosphere in which the dew point was set to −60° C. or less, and the oxygen value was set to 1 ppm or less.

First, Sample 1 of the positive electrode active material, acetylene black, and a polytetrafluoroethylene (PTFE) were weighed so as to have a mass ratio of 7:2:1. The raw materials thus weighed were mixed using an agate mortar. Accordingly, a positive electrode mixture was obtained. This positive electrode mixture was rolled by a roller pressing machine to have a thickness of 100 μm and was then punched out to have a square shape having a size of 5 mm by 5 mm. As a result, a positive electrode mixture plate was obtained.

The positive electrode mixture plate was placed on a Pt mesh having a size of 8 mm by 30 mm and was then set in a pressing machine. A pressure of 20 MPa was applied for 10 seconds to the positive electrode mixture plate and the Pt mesh for pressure bonding. Accordingly, a positive electrode containing Sample 1 was obtained.

As a counter electrode, a Pt mesh having a size of 8 mm by 30 mm was prepared.

As a reference electrode, an Ag/AgCl reference electrode was prepared. The Ag/AgCl reference electrode was formed of a glass tube filled with an inner solution and an Ag wire which was inserted in the glass tube and which had a surface on which AgCl was formed in advance. As the inner solution, a potassium chloride saturated aqueous solution was used.

The positive electrode functioning as a working electrode, the counter electrode, and the reference electrode were set in a H type cell, and the H type cell was filled with an electrolyte liquid. As the electrolyte liquid, a solution in which anhydrous cesium fluoride (CsF) was dissolved in ethylene glycol (EG) at a molar ratio, CsF: EG, of 1:10 was used. In the H type cell, the counter electrode was separated from the working electrode and the reference electrode by a glass filter.

Accordingly, a battery cell using Sample 1 was obtained.

By a method similar to that described above, battery cells using Samples 2 and 3 were also respectively formed.

[3-3-2. Formation of Battery Cells Using Sample 4 to 6]

Except for that a Pb/PbF$_2$ reference electrode was used instead of the Ag/AgCl reference electrode, and that Samples 4 to 6 were used instead of Sample 1, battery cells of Samples 4 to 6 were respectively formed by a method similar to that of the above battery cell.

The Pb/PbF$_2$ reference electrode was formed of a glass tube filled with an inner solution and a Pb wire which was inserted in the glass tube and which had a surface on which PbF$_2$ was formed in advance. As the inner solution, a solution in which anhydrous cesium fluoride (CsF) was dissolved in ethylene glycol (EG) at a molar ratio, CsF:EG, of 1:10 was used.

[3-4. Discharge Test]

[3-4-1. Discharge Test of Battery Cells Using Samples 1 to 3]

A discharge test was performed on the battery cells using Samples 1 to 3. This test was performed in a constant-temperature bath at 25° C. In particular, at a rate of 0.01 C calculated from the theoretical capacity of the positive electrode active material, the discharge was performed so that the potential of the working electrode was changed from a region of a first plateau potential to a region of a second plateau potential which was lower than the above region, and the initial discharge characteristics of each battery cell were evaluated. In particular, the battery cell using Sample 1 was discharged until the difference in potential between the working electrode and the reference electrode reached −800 mV, and the battery cell using Sample 2 was discharged until the difference in potential reached −500 mV. The battery cell using Sample 3 was discharged until the difference in potential reached −700 mV.

Figure 3:
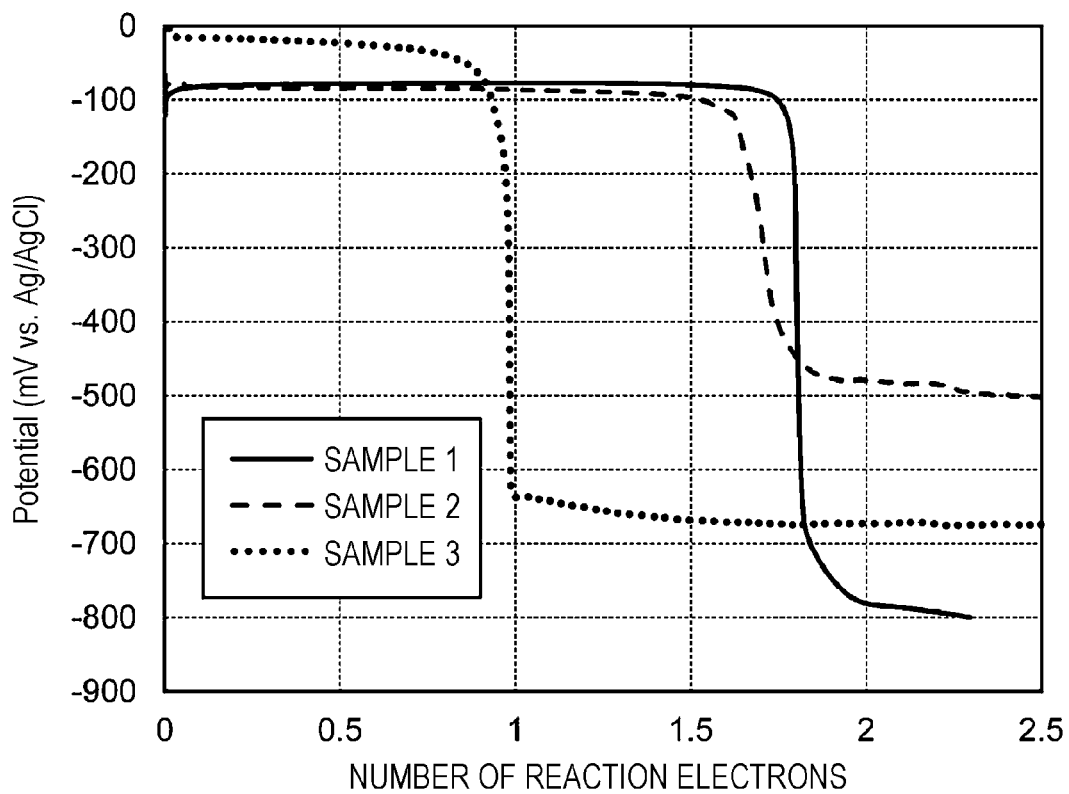
FIG. 3 is a graph showing examples of discharge curves of battery cells.

FIG. 3 shows the discharge curves of the battery cells using Samples 1 to 3. As shown in FIG. 3, the discharge curves of the battery cells using Samples 1 to 3 each showed a flat plateau region. The first plateau potential (that is, reducing potential) of the battery cell using Sample 1 (that is, Cs$_2$CuF$_4$) was approximately equal to that of the battery cell using Sample 2 (that is, CuF$_2$). The discharge curves of the battery cell suing Sample 1 (that is, Cs$_2$CuF$_4$) and the battery cell using Sample 3 (that is, (NH$_4$)$_2$CuF$_4$) each showed a steep potential drop from the region of the first plateau potential to the region of the second plateau potential. The reason for this is inferred that in the battery cells using Samples 1 and 3, an unnecessary side reaction was suppressed between the active material and the electrolyte liquid.

In the battery cell using Sample 1 (that is, Cs$_2$CuF$_4$), the number of reaction electrons per Cu atom was 1.8. On the other hand, in the battery cell using Sample 2 (that is, CuF$_2$), the number of reaction electrons per Cu atom was 1.5. Accordingly, it was shown that Cs contained in Sample 1 could increase the number of reaction electrons of the battery. The reason for this is inferred that since the reaction rate of the defluorination reaction is increased using Cs contained in Sample 1 as an origin, the overvoltage is reduced.

In addition, in the battery cell using Sample 3 (that is, (NH$_4$)$_2$CuF$_4$), the number of reaction electrons per Cu atom was 1.0.

After the discharge test was performed, the phase composition of Sample 1 was analyzed using an XRD. As a result, it was confirmed that Cs$_2$CuF$_4$ was changed to Cu. As was the case described above, the phase composition of Sample 3 after the discharge test was changed from (NH$_4$)$_2$CuF$_4$ to Cu.

Furthermore, a charge test was performed on the battery cell using Sample 1, and the phase composition of Sample 1 was analyzed using an XRD. As a result, it was confirmed that Cu was changed to Cs$_2$CuF$_4$. From the results described above, it was shown that Sample 1 performed the following reversible reaction by charge/discharge.

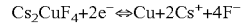

$$Cs_2CuF_4 + 2e^- \Leftrightarrow Cu + 2Cs^+ + 4F^-$$

[3-4-2. Discharge Test of Battery Cells using Samples 4 to 6]

A discharge test was performed on the battery cells using Samples 4 to 6. In particular, at a rate of 0.01 C calculated from the theoretical capacity of the positive electrode active material, discharge was performed until the potential of the working electrode reached 200 mV.

Figure 4:
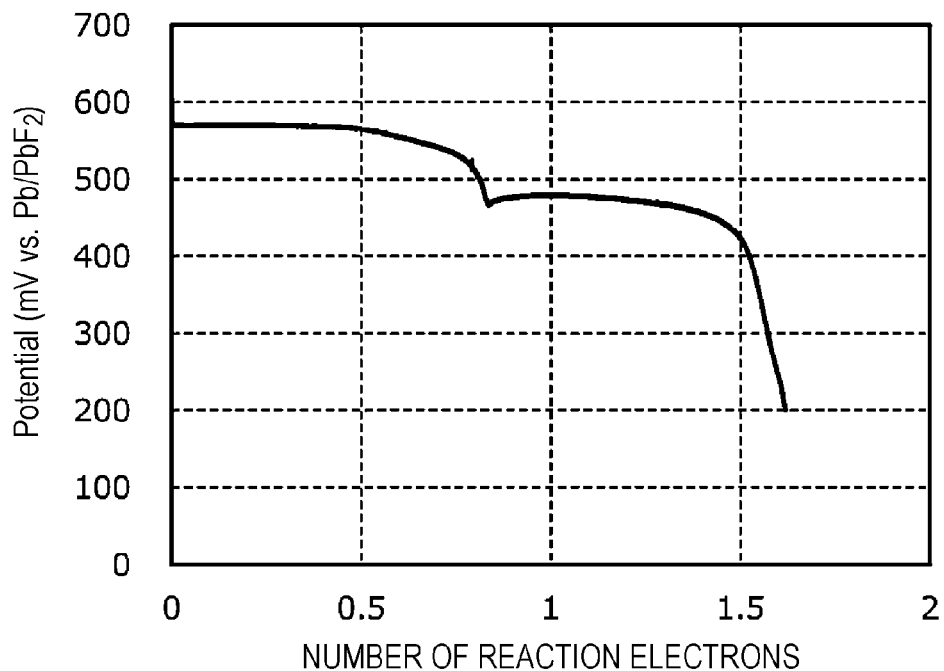
FIG. 4 is a graph showing one example of a discharge curve of a battery cell.

FIG. 4 shows the discharge curve of the battery cell using Sample 4. As shown in FIG. 4, the discharge curve of the battery cell using Sample 4 first showed a flat first plateau potential and then showed a flat second plateau potential which was slightly lower than that of the first plateau potential, and subsequently, the potential decreased from the second plateau potential to 200 mV. It is estimated that the first plateau potential shows a reaction in which the valence of Ni is changed from divalence to lower valence while the structure of Sample 4 (that is, NaNiF$_3$) is maintained. In addition, it is estimated that the second plateau potential shows a conversion reaction in which Ni ions are reduced to a Ni metal.

In the battery cell using Sample 4 (that is, NaNiF$_3$), the number of reaction electrons per Ni atom was 1.6, and the initial discharge capacity was 320 mAh/g. The results are believed to indicate that Na contained in Sample 4 promotes the defluorination reaction and increases the discharge capacity.

In addition, the battery cell using Sample 5 (that is, RbNiF$_3$) also showed a discharge reaction, and the number of reaction electrons per Ni atom was 1.0 per Ni atom. Furthermore, the battery cell using Sample 6 (that is, NaMnF$_3$) also showed a discharge reaction, and the number of reaction electrons per Mn atom was 1.2 per Mn atom.

[3-5. Dissolution of Transition Metal]

After the charge/discharge test was performed, the color of the electrolyte liquid of each of the battery cells using Samples 1 and 2 was confirmed by visual inspection. As a result, the electrolyte liquid of the battery cell using Sample 1 was colorless and transparent as it was, and the electrolyte liquid of the battery cell using Sample 2 had a light blue color. Those results indicate that Cs contained in Sample 1 can suppress the dissolution of $Cu^{2+}$ into the electrolyte liquid.

After the charge/discharge test was performed as described above, the electrolyte liquid of the battery cell using Sample 3 was colorless and transparent as it was. This result indicates that $NH_4^+$ contained in Sample 3 can suppress the dissolution of $Cu^{2+}$ into the electrolyte liquid.

[3-6. Supplement]

Except for that anhydrous potassium fluoride (KF) was used instead of CsF, by a method similar to that of Sample 1, $K_2CuF_4$ was formed as Sample 7. In a battery cell using Sample 7, the dissolution of $Cu^{2+}$ into the electrolyte liquid was not observed.

As described in the above [1-2. Assumed Mechanism], it is inferred that a large number of reaction electrons, a large discharge capacity, and/or suppression of metal dissolution can be obtained when the composite fluoride contains a metal or $NH_4$ each of which has a relatively high ionization tendency. Hence, it is expected that this advantage is not limited to the concrete compositions shown by the above experiments and can also be obtained, for example, by the other compositions described in the above [1-1. Composition of Active Material].

What is claimed is:

1. A fluoride ion secondary battery comprising:
a positive electrode including a composite fluoride represented by a formula $A_xM_yF_z$, where A is Na, K, Rb, Cs, or $NH_4$, M is at least one selected from the group consisting of Mn, Fe, Co, Ni, and Cu, $1 \leq x \leq 2$, $1 \leq y \leq 2$, and $3 < z < 5$;
a negative electrode; and
an electrolyte having a fluoride ion conductivity.

2. The fluoride ion secondary battery according to claim 1,
wherein A is Na or Cs.

3. The fluoride ion secondary battery according to claim 1,
wherein A is K, Cs, or $NH_4$.

4. The fluoride ion secondary battery according to claim 1,
wherein M is Cu.

5. The fluoride ion secondary battery according to claim 1,
wherein the positive electrode further includes, besides the composite fluoride, a fluoride of a transition metal that is the same as the M contained in the composite fluoride.

6. The fluoride ion secondary battery according to claim 1,
wherein the electrolyte contains: ions of the element A contained in the composite fluoride.

7. The fluoride ion secondary battery according to claim 1,
wherein the electrolyte further contains ions of the element M contained in the composite fluoride.

8. The fluoride ion secondary battery according to claim 1,
wherein the electrolyte contains a solvent, and a fluoride salt dissolved in the solvent.

9. The fluoride ion secondary battery according to claim 8,
wherein the fluoride salt is at least one selected from the group consisting of lithium fluoride, sodium fluoride, potassium fluoride, rubidium fluoride, cesium fluoride, and ammonium fluoride.

10. The fluoride ion secondary battery according to claim 8,
wherein the fluoride salt is at least one selected from the group consisting of tetramethylammonium fluoride, neopentyltrimethylammonium fluoride, trineopentylmethylammonium fluoride, tetraneopentylammonium fluoride, 1,3,3,6,6-hexamethylpiperidinium fluoride, 1-methyl-1-propylpiperidinium fluoride, tetramethylphosphonium fluoride, tetraphenylphosphonium fluoride, and trimethylsulfonium fluoride.

* * * * *